Patented Nov. 6, 1928.

1,690,705

UNITED STATES PATENT OFFICE.

HERMAN SEYDEL, OF JERSEY CITY, NEW JERSEY.

BENZOIC ACID SALT OF AMINO BENZOIC ESTERS.

No Drawing.　　　Application filed April 5, 1927. Serial No. 181,269.

This invention relates to a new chemical for medicinal use having antiseptic as well as anesthetic properties.

The primary object of the invention is the provision of a new medicinal compound obtained from benzoic acid and an anesthtic such as para amino benzoyl ethanol which may be appropriately termed a benzoate of an amino benzoic ester.

This invention relates to the provision of a benzoic acid salt of the ethyl ester of para amino benzoic acid.

In the formation of the improved chemical it is preferred to use, by weight, para amino benzoyl ethanol in the proportion of 57½% to 42½% of benzoic acid. In the manufacture the para amino benzoyl ethanol is dissolved in the required quantity of dilute hydrochloric acid, and adding the filtered solution to a previously filtered solution of sodium benzoate, from which medium is precipitated a white finely divided powder which can be readily washed and freed from the sodium chloride, which is also formed as a result of the reaction. If the materials used in the reaction are of high purity, it is found unnecessary to refine the product further. For further refining, however, the para amino benzoyl ethanol benzoate may be dissolved in a suitable medium, treated with decolorizing carbon, or refined in any approved way available for organic chemicals of high purity.

The principal benzoates of amino benzoic esters are those of anesthesin, butesin, propesin, procaine, etc., and the characteristics of these esters are:—ready solubility in oils, and alcohols, and slight solubility in water.

As to the slight solubility in water, the same prompts absorption of the chemical by tissues, and thereby increases both its antiseptic and anesthetic value.

The ready solubility of the improved chemical in oil permits its being used in ointments, salves, or unguents for the treatment of skin lesions and irritations, such as burns, sunburn, etc.

The ready solubility of the improved medical chemical in alcohol and benzyl alcohol makes possible its use as a local anesthetic for the relief of mucous infections, and renders the same of value in the treatment of gumboils, throat infections, and in general wherever the use of benzocaine or benzyl alcohol, or both are indicated.

The solubility of the improved compound is benzyl alcohol also makes possible a dilution of both in such media as pure olive oil, almond oil, or any other oil which may be safely injected subcutaneously, and be used for such purposes as the relief of local nerve irritation and particularly the ailment described as pruritus ani, for which the improved compound seems to afford distinct relief.

One form of the improved chemical may be called para amino benzoyl ethanol benzoate having the chemical formulæ:

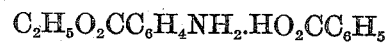

the structural formulæ of which may be represented as follows:

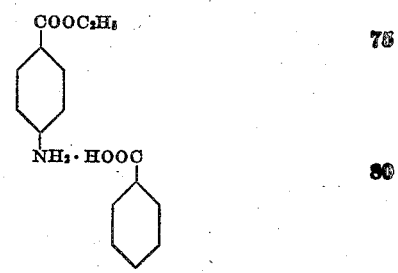

and containing by weight, approximately 57½% of para amino benzoyl ethanol and 42½% by weight of benzoic acid. The melting point of this is between 70° and 71° C. and it is soluble in water 2/10 of 1% at room temperature, or approximately 25° C. The same is further soluble in alcohols, oils, and a number of other solvents as is obvious.

A general method of synthesizing the benzoic acid salt is to dissolve in molecular proportions benzocaine (anethesin) or other similar amino esters and benzoic acid in adequate quantities of ethyl alcohol and to add each solution to the other, and upon evaporating and cooling, the products of this invention will crystallize out in colorless crystals having sharp or distinct melting points.

As proof that the subject of this application is a chemical compound and not a mixture, the reactions are cited as follows:

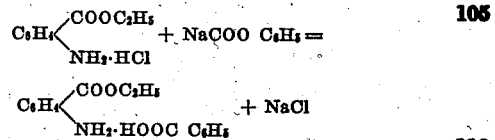

A further proof that the resultant product is a chemical compound is its definite melting point of 70° to 71° C. which is much lower than either of its components.

It is intended that the compound will not only cover the benzoic acid salts of the esters of para amino benzoic acid, but also of the ortho and meta amino benzoic acids, and therefore departures may be made from the invention within the liberal interpretation of the scope of the claims.

I claim:

1. As new products of manufacture benzoic salts of amino benzoic esters.

2. A new product comprising a benzoate of ethyl amino benzoate.

3. A new product of manufacture comprising the compound $C_2H_5O_2CC_6H_4NH_2 \cdot HO_2CC_6H_5$.

4. A new product of manufacture comprising benzoate of an amino benzoic ester in white crystalline powdered form, having a melting point of 70° C. to 71° C.

5. As a new product of manufacture a benzoate of an aromatic acid ester, having an amino group in the aromatic nucleus.

6. As a new product, the substance having the structural formula

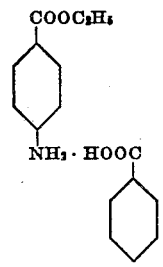

HERMAN SEYDEL.